July 17, 1934.  C. F. SMITH  1,966,769
APPARATUS FOR PRODUCING OR ANALYZING POLARIZED LIGHT
Filed June 24, 1933  2 Sheets-Sheet 1
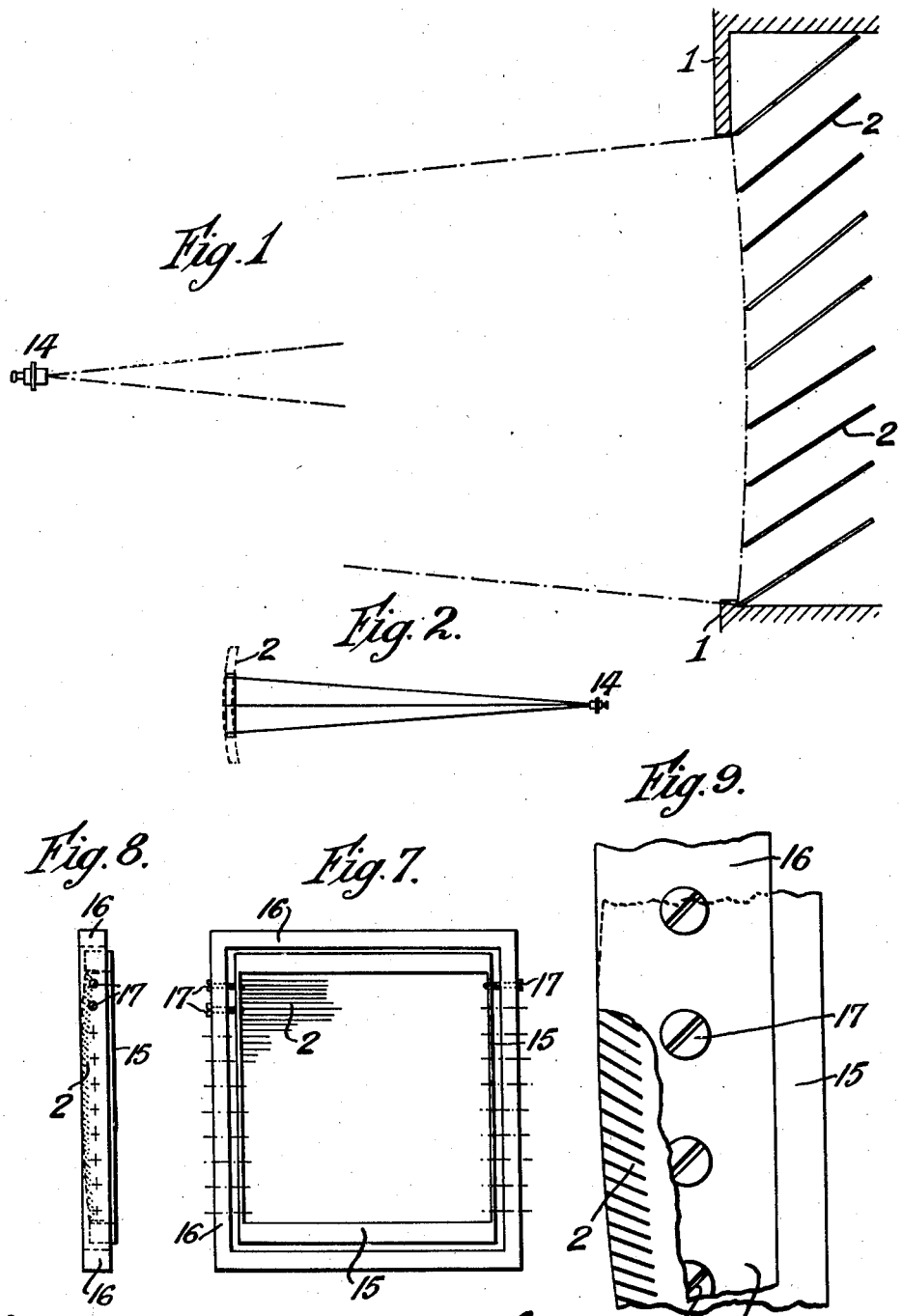
Inventor: Charles Frederick Smith
By His Attorneys: Baldwin Wight July 17, 1934.   C. F. SMITH   1,966,769
APPARATUS FOR PRODUCING OR ANALYZING POLARIZED LIGHT
Filed June 24, 1933   2 Sheets-Sheet 2

Inventor: Charles Frederick Smith
By His Attorneys:
Baldwin Wight

Patented July 17, 1934

1,966,769

UNITED STATES PATENT OFFICE 1,966,769

APPARATUS FOR PRODUCING OR ANALYZING POLARIZED LIGHT

Charles Frederick Smith, London, England, assignor to Adam Hilger, Limited, London, England Application June 24, 1933, Serial No. 677,511
In Great Britain June 8, 1932

8 Claims. (Cl. 88—14)

The invention is concerned with polarized light and provides a novel means for providing an extensive field of polarized light for such purposes as the viewing of glassware to detect strains.

The means heretofore used for polarizing light consist generally of prisms made of Iceland spar, or plates of glass or other non-metallic reflecting materials which, if used at the correct angle, almost, although not quite, perfectly polarize the light reflected from them. Amongst the disadvantages of the means of polarizing heretofore existing are the following:—

(a) Polarizing prisms are expensive owing to the rarity and high cost of clear pieces of Iceland spar, and the expense of manufacture of polarizing prisms therefrom. Furthermore pieces of Iceland spar are no longer obtainable, at no matter what price, in sizes large enough to cut prisms of more than 50 mm. effective aperture.

(b) The angular field of the polarized light pencils which are transmitted by polarizing prisms is always limited by the nature of the substances used. Iceland spar is the best of such substances, with the exception of a few artificial crystals which scarcely come into consideration owing to the fact that clear crystals of large size cannot be made, and that such crystals (as for instance Chile saltpetre) are highly soluble and very difficult to utilize and are not durable.

In both of these cases it is impossible to produce an extensive area of polarized light.

(c) In polarizing by reflection the pieces of reflecting material required are large compared with the area of the effective beam of polarized light. Actually polarizing plates require to be approximately 1¾ times the area of the desired beam of polarized light. Again the direction of the reflected light is nearly at right angles to that of the incident light which is very inconvenient in the construction of some types of apparatus.

In the application of polarizers more particularly under consideration, the above disadvantages become serious when it is desired to examine glass objects of large size, as for instance large sheets of glass, and it is very desirable that a large area should be examined at a glance. The apparatus then becomes excessively bulky if made with the ordinary reflector polarizers and sometimes impossibly so.

According to the present invention means for providing polarized light substantially uniform in intensity and in completeness of polarization over an extensive field of view from a particular point of observation for such purposes as viewing glassware for strains comprises a source of light, a diffusing surface located to receive light therefrom and to act as secondary source of illumination, and a set of polarizing reflectors arranged after the manner of louvres between the said reflecting surface and the said point of observation, each of said reflectors being set at the optimum polarizing angle in relation to the point of observation.

For this purpose the successive louvres may be set at a slight angle to each other or each louvre may be suitably curved throughout its length, or again these two features may be combined.

Further features of the invention will be explained by means of the accompanying drawings showing in diagrammatic form embodiments of the invention in which:

Figure 1 is a sectional elevation of a polarizer according to the invention,

Figure 2 is a sectional plan of the same,

Figure 4:
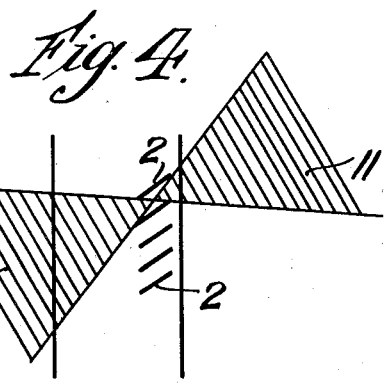
Figure 6:
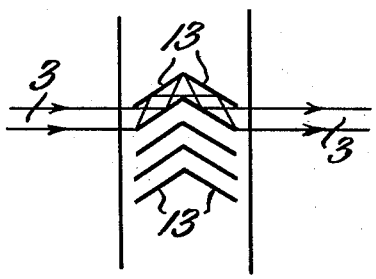
Figure 5:
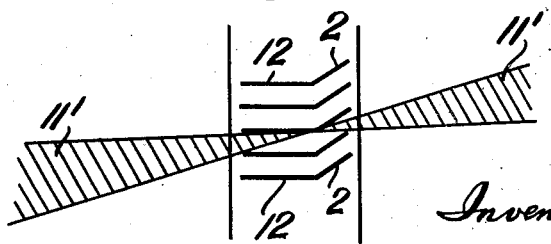

Figure 4 indicates light leakage which may occur in certain cases,

Figure 5 shows the addition of diaphragms to overcome this leakage,

Figure 6 represents a modified construction for the same purpose,

Figure 7 is an elevation and Figure 8 a side elevation of a modified form of polarizer, and Figure 9 is an enlarged view of a part of Figure 8 to show constructional details.

Referring to Figures 1 and 2, a frame 1 has mounted within it a plurality of reflectors 2 oblique to the direction of light and set at equal intervals. The analyzer is mounted in an eyepiece at 14 located at a prescribed distance from the polarizer and preferably opposite its middle point. The reflectors 2 are not parallel with each other but all make the same angle with a straight line drawn to the eyepiece 14. Figure 2 shows a refinement which may not always be necessary, viz. the curvature of the louvres along their length so that every part is at the optimum polarizing angle in relation to the point of view 14. The front edges of the louvres thus all lie on a sphere having its centre at 14. If the louvres 2 are of substantial width it may be found desirable to make them of slightly curved section to maintain the optimum polarizing angle over the width of each one.

The louvres 2 may each consist of a strip of black glass, polished on one side, and white (whether polished white or matt), chromium plated, silvered, nickeled or the like on the other side. There is glass to be obtained which is black on one side, and white on the other, which is very suitable for the purpose, or the strips may consist of metal blacked or varnished on one side and polished bright, or coated bright, or painted white or the like on the other. Strips of ferro-type plate like that used for glazing photographic prints are suitable. The width of the louvres depends on the purpose for which the polarizer is to be used. In some cases the louvres may consist of thin narrow ribbon wound on a frame with appropriate locating devices.

By the setting of each louvre to the optimum polarizing angle large densities of polarized light can be obtained. The louvre system can be used as a polarizing or analyzing device in visual projection or photographic work where the Nicol prism or other analyzer would ordinarily be used, and in such applications a separate setting of each strip to the best polarizing angle is a great advantage.

In order that the intensity of illumination in addition to the completeness of polarization should be as uniform as possible over the entire field, the principle may be applied whereby light obtained from a source is reflected on a diffusing surface so curved that the intensity of illumination over the entire surface is equal. For this purpose the distance R from the source to the diffusing surface is related to the angle $i$ made by the incident ray with that surface by the equation $$\frac{1}{R^2} \cos i = \text{constant}.$$

Figure 3:
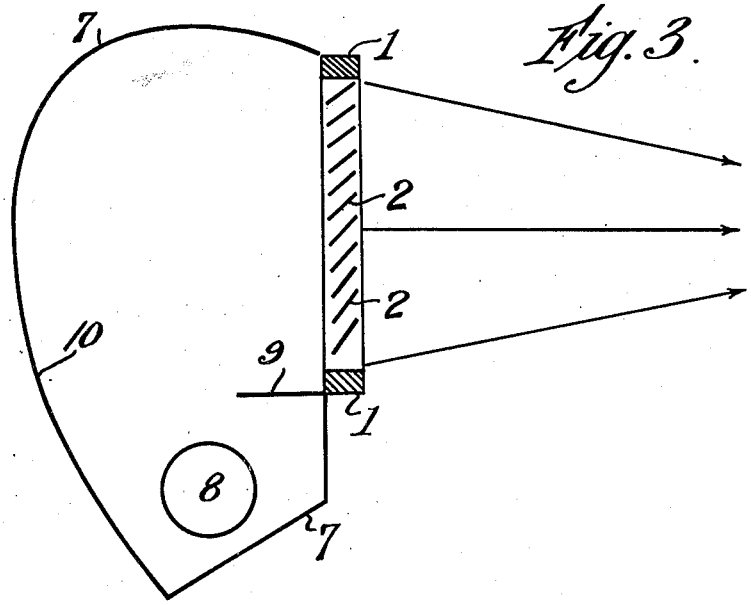
Figure 3 shows an arrangement similar to Figure 1 but with a separate device for providing uniform illumination in a form of a diffusely reflecting surface.

A polarizer embodying these features of the invention is shown in Figure 3. A frame 1 containing louvres 2 of the nature above described and set at a variable angle to give the maximum polarizing effect from each one at the point of observation, is mounted on the front of a light box 7. A source of light 8 is placed in the light box and is located in an extension thereof towards one side. A small internal screen 9 is interposed between the light source and the louvre frame to intercept direct rays of light. The back 10 of the box is curved to conform to the above formula and is coated with material giving a diffused reflection or otherwise rendered capable of such reflection. The actual curve may, if necessary, be corrected if the reflective property is not the same in all directions or the source of light may be duplicated by placing a second source 8 and screen 9 on the other side, if a corresponding curvature is given to the back reflecting surface 10.

Where the maximum of light is desired, however, the light can be obtained direct from the illuminating source without the interposition of a separate diffusing reflecting surface. The diffusing means is then constituted by the matt white surfaces of the louvre strips.

Since in effect a source of diffused light is used for illumination of the louvre strips it is possible for light to be transmitted to some extent direct through the intervening spaces, that is, without reflection at the louvre surfaces. This is indicated by the shaded areas 11 in Figure 4 where the louvres are purposely shown rather narrower than previously indicated. The precautions taken to avoid this direct transmission will depend entirely on the extent to which it is deleterious in the use to which the polarizer is to be put. It is possible to reduce the amount of unpolarized light by means of screens 12 as shown in Figure 5 constituting extensions of the louvres in a direction parallel to the direction of the light. The screens are shown applied to one side only of the louvres 2 and the shaded areas 11' indicate the improvement effected by their use. A further improvement can be obtained by applying the screens to both sides of the set of louvres. Preferably the screens 12 are matt black on both surfaces to avoid reflection which would reduce their effectiveness.

An alternative construction for achieving this same object is shown in Figure 6. Here each louvre 13 is of V-section, the reflecting surfaces being duplicated. The spacing and depth is preferably then so related as shown in the figure that there is no direct rectilinear path between adjacent louvres, and unpolarized light is thus completely cut off. It will be seen also that polarization is then effected by a double reflection at polarizing surfaces so that it is more complete, that is, the density of polarization is greater.

Figures 7, 8 and 9 show a construction of polarizer which may be more suitable for use with a flood lantern than the kind with glass louvres. The louvres in this construction are thin narrow strips 2 of metal such as stainless steel with a black reflecting coating on one side and preferably matt white on the other side. With a matt white finish it will usually be found possible to dispense with a separate diffusing device in view of the narrowness of the louvres and still to secure even illumination. The louvre strips are welded at each end into a frame 15 having flexible sides and placed within a stiff frame 16. Screws 17 engage tapped holes in the sides of the frame 15 and clearance holes in the sides of the frame 16 and are tightened up to overcome any tendency of the louvres 2 to kink or bend.

It is possible by arranging the louvres on a spherical surface as indicated above to ensure that light reaching an observer at the centre of the sphere from all directions outside shall be polarized in a given plane, or that all light proceeding from a source of light at the centre of the sphere shall be polarized in whatever direction it proceeds.

With any of the arrangements described above it is also possible to replace the fully reflecting surface by a polarizing surface. In other words the louvres would have a polished black surface on both sides, this surface being constituted in any suitable way, such as by black glass or blackening and varnishing. This would have the effect of giving more perfect polarization on account of the doubled reflection.

The applications of the louvres are not confined to large sizes. For example a pair or two separate pairs of small louvres may be used for viewing purposes, by means of which two eyes can be used simultaneously for an observation of a large angular field, which greatly conduces to the comfort and efficiency of the observer; for instance in the use of strainviewers for the examination of glassware over long periods it is found that where binocular observation can be used the strain of observation is far less, and work can be efficiently performed over much longer periods without strain.

What I claim is:—

1. Means for providing polarized light substantially uniform in intensity and in completeness of polarization over an extensive field of view from a particular point of observation comprising in combination a source of light, a diffusely reflecting surface located to receive light therefrom and to act as secondary source of illumination, and a set of polarizing reflectors arranged after the manner of louvres between the said diffusely reflecting surface and the said point of observation, each of said reflectors being set at the optimum polarizing angle in relation to the point of observation.

2. Means for providing polarized light substantially uniform in intensity and in completeness of polarization over an extensive field of view from a particular point of observation, comprising in combination a source of light, a diffusing surface located to receive light therefrom and to act as secondary source of illumination, and a set of curved polarizing reflectors arranged after the manner of louvres between the said surface and the said point of observation, each of said reflectors being so curved throughout its length and so set that every part along the length is at the optimum polarizing angle in relation to the point of observation.

3. Means for providing polarized light substantially uniform in intensity and in completeness of polarization over an extensive field of view from a particular point of observation, comprising in combination a source of light, a diffusing surface located to receive light therefrom and to act as secondary source of illumination, and a set of doubly curved polarizing reflectors arranged after the manner of louvres between the said surface and the said point of observation, each of said reflectors being so curved throughout its length and across its width and being so set angularly that every part of its surface is at the optimum polarizing angle in relation to the point of observation.

4. Means for providing polarized light substantially uniform in intensity and in completeness of polarization over an extensive field of view from a particular point of observation, comprising in combination a source of light, a diffusely reflecting surface located to receive light therefrom and to act as secondary source of illumination, and a set of double-sided polarizing reflectors arranged after the manner of louvres between the said diffusely reflecting surface and the said point of observation, each of said reflectors being set at the optimum polarizing angle in relation to the point of observation.

5. Means for providing polarized light substantially uniform in intensity and in completeness of polarization over an extensive field of view from a particular point of observation, comprising in combination a source of light, a diffusing surface located to receive light therefrom and to act as secondary source of illumination, and two adjacent sets of polarizing reflectors arranged after the manner of oppositely directed louvres between the said surface and the said point of observation, each louvre of one set being adjacent at one edge to an edge of a louvre of the other set.

6. Means for providing polarized light substantially uniform in intensity and in completeness of polarization over an extensive field of view from a particular point of observation, comprising in combination a source of light, a diffusing surface located to receive light therefrom and to act as secondary source of illumination, and two adjacent sets of double-sided polarizing reflectors arranged after the manner of oppositely directed louvres between the said surface and the said point of observation, each louvre of one set being adjacent at one edge to an edge of a louvre of the other set.

7. Means for providing polarized light substantially uniform in intensity and in completeness of polarization over an extensive field of view from a particular point of observation, comprising in combination a source of light, a diffusing surface located to receive light therefrom and to act as secondary source of illumination, a set of polarizing reflectors arranged after the manner of louvres between the said surface and the said point of observation, and a set of screens on at least one side of the set of louvres substantially parallel to the direction of the light and each adjacent to a louvre at the edge thereof.

8. Means for providing polarized light substantially uniform in intensity and in completeness of polarization over an extensive field of view from a particular point of observation, comprising in combination a source of light and a set of polarizing reflectors arranged after the manner of louvres between the said source of light and the said point of observation and each having on the side towards the source of light a diffusing surface to receive light therefrom and to act as secondary source of illumination and on the other side a polarizing reflecting surface.

CHARLES FREDERICK SMITH.